May 26, 1936.  A. E. TRAVER  2,042,281
COMPARATIVE COLORIMETER
Filed Nov. 2, 1934
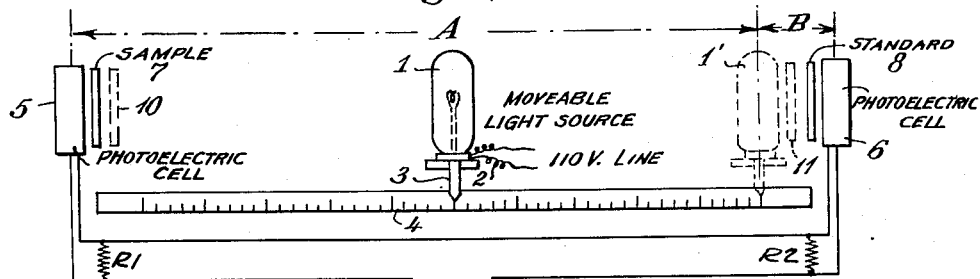
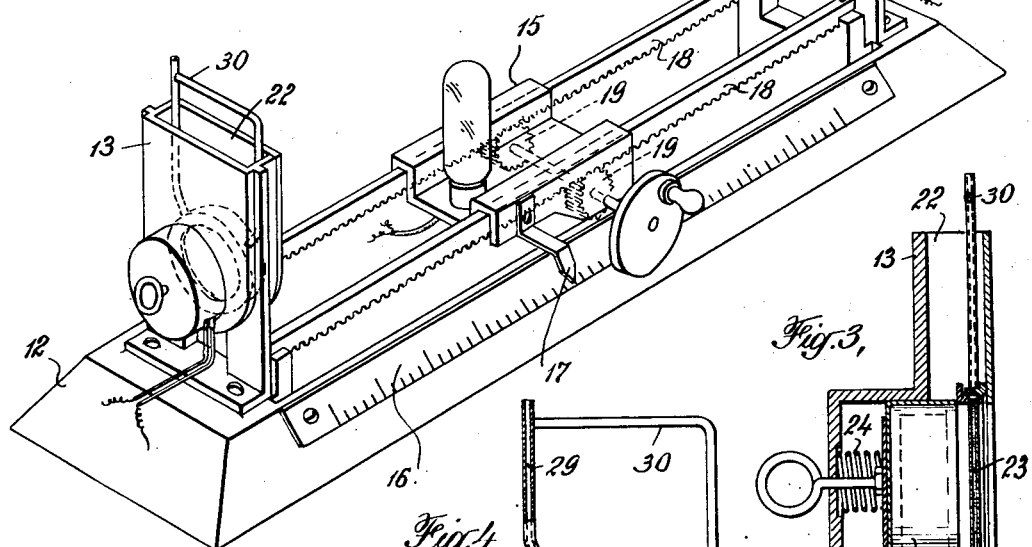
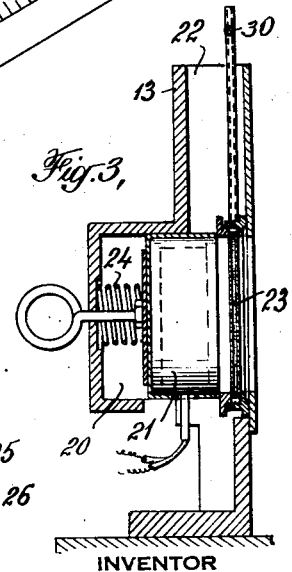
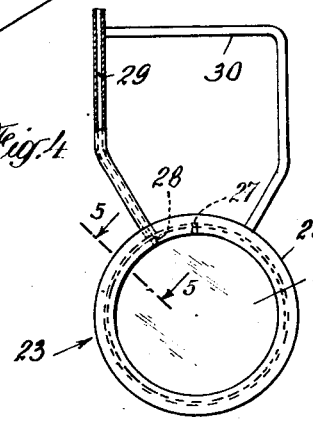
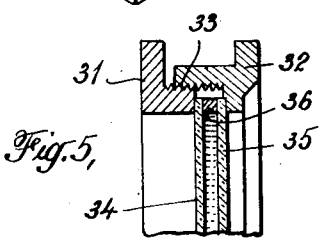
INVENTOR
Alfred E. Traver
BY
ATTORNEY Patented May 26, 1936

2,042,281

UNITED STATES PATENT OFFICE 2,042,281

COMPARATIVE COLORIMETER

Alfred E. Traver, Brooklyn, N. Y., assignor to Socony-Vacuum Company, Incorporated, New York, N. Y., a corporation of New York Application November 2, 1934, Serial No. 751,129

2 Claims. (Cl. 88—14)

This invention has to do with devices for determining the color, depth of color, and particularly the optical density of substances capable of transmitting light.

Former devices of this nature have in general consisted of a source of light, a cell in which the substance to be examined may be placed, and a light sensitive photoelectric cell to measure the amount of light transmitted by the material examined. The amount of light transmitted, measured by a suitable instrument in circuit with the light sensitive cell, expresses the optical density of the material examined. With the interposition of suitable color filters, and the like, the measurement may express color. These former devices have as major defects the inability to compensate for such variables as decreasing intensity of light source with age, variable intensity of light source caused by variable voltage, general inability to competently use alternating current direct from the usual supply, variations arising from various causes in the photoelectric cell, and inaccuracies in the general measuring equipment. All of these difficulties may be handled, it is true, by compensating and adjusting devices. These devices introduce undue complications of equipment and handling routine, as well as new sources of error.

It is therefore an object of this invention to devise a comparative colorimeter or optical density meter which is capable of avoiding, by reason of its novel construction, the difficulties incident upon varying intensity of light source. A further object of the device is to enable direct comparison of the substance examined with a reference standard, and another object is the elimination of errors incident to inaccuracies of the ordinarily used electrical measuring instruments. An important object is the ability to use a large and extended scale without complicated mechanisms. Still another object is the attainment of capability to operate at a very high level of illumination. A major object is attainment of ability to operate from a light source connected directly to an ordinary lighting circuit, without the interposition of voltage regulating devices or batteries. Other major objects are the attainment of these capabilities in an apparatus of simple design, without complicated shutters, filters, scales, and the like, and capable of withstanding hard usage and of being easily maintained at a high level of accuracy. Other objects and advantages will appear hereinafter.

All of these objects have been attained by the novel arrangement of two matched light sensitive cells, actuated by a single light source, in a balanced circuit, with the substance to be examined placed before one cell, a blank or reference before the other, the light source being manipulated to restore the balance, and the relative values of substance and reference determined by the position of the light source.

In order to make my invention clear, reference is now made to the drawing attached to and forming a part of this specification. In the drawing, Figure 1 is a diagrammatic representation of the invention. Figure 2 is a perspective assembly drawing of the apparatus, Figure 3 is a section of the sample cell and photoelectric cell standard, Figure 4 is a view of a sample cell and Figure 5 a section of the sample cell.

In the diagrammatic showing of Figure 1, 1 is a source of light, connected by conductors 2 to any usual source of lighting current, such as 110 volt A. C. or D. C. as usually supplied. Light source 1 is adapted for movement along scale 4, and pointer 3 serves to determine its position with respect to that scale. At the extremities of scale 4 there are placed photoelectric cells 5 and 6. These photoelectric cells are matched to give equal output at equal light intensity. In front of these photoelectric cells are placed sample chambers 7 and 8. The current originating in the photoelectric cells passes through the measuring circuit consisting of the resistances $R_1$, $R_2$, $R_3$ and the galvanometer 9, as shown.

The method of operation is as follows: A sample to be studied is placed in sample chamber 7, and a reference material is placed in chamber 8. Then light source 1 is moved along scale 4 until the current generated by the matched cells 5 and 6, as indicated by the galvanometer, is equal, that is, until the galvanometer indicates that no current is flowing.

The attainment of this condition indicates that the intensity of the light reaching each photoelectric cell is the same, and consequently the relative light transmissive properties of the sample and reference standard is expressed by the position of the light source 1 on the scale 4. In calibration of the scale, the midpoint is designated 1.00, indicating equal densities of sample and standard. If 8 be the standard cell then the right hand end of scale 4 will show quantities decreasingly less than 1, indicating a sample lighter than the standard, and the left hand end will show quantities increasingly greater than 1, indicating a sample darker than the standard. The position of scale markings can be determined by application of the law that intensity of light varies inversely as the square of the distance from the source. If the position of the light source be as shown at 1', then $1/A^2 = K \times 1/B^2$ where K is the value of sample 8 relative to sample 7. Color comparisons of great accuracy can likewise be made if matched filters be inserted at 10 and 11, as shown in dotted lines.

Due to the method of continuously observing the light source through both standard and reference, variations of intensity of the light source are without effect, as they fall upon both equally. Variations between photoelectric cells once matched are much less than of either from standard, and compensating adjustment may be quickly made by operation without sample or standard. Accuracy does not depend upon the accuracy of scale of an electrical instrument, but only upon the delicacy of null point observation of an instrument which may be sturdily constructed. Due to taking direct advantage of the laws of light intensity, the scale, simple as it is, has a range and capability of accuracy within that range far greater than the usual mechanism. Greater accuracy of determination in the extended portion of the scales may be secured by substituting for the base standard reference a secondary reference, lighter or darker than the base standard in known ratio, as desired, and the value of this secondary need only be known, not carefully adjusted, as the final determination can be computed by multiplication of two observed values.

Figure 2 is an assembly of the machine, shown in perspective, wherein 12 is the base, 13 and 14 are the standards containing the photoelectric cells and sample chambers, 15 is the carriage with the light source, 16 is the scale, 17 the pointer, 18 a rack, and 19 a gear and crank whereby carriage 15 may be moved with respect to the scale.

Figure 3 is a section of one of the end standards, 13, or 14, in which 13 is the body, 20 a recess therein to receive a photoelectric cell, 21, 22 is a slot to receive the sample cell indicated by 23, and 24 is a spring to insure proper position of sample and photoelectric cell.

In Figure 4 the sample or standard cell is shown, consisting of a frame 25, circular in shape, within which is a glass walled chamber 26, which has a vent hole 27, a filling hole 28, served by a filling pipe 29, and fitted with a handle 30. The internal construction of this cell is shown by the sectional view of Figure 5, wherein frame members 31 and 32 are shown, being capable of being joined by the threaded joint 33. Between appropriate shoulders upon 31 and 32, two panes of glass 34, and 35 are confined, separated by ring spacer 36. The depth of this ring spacer will vary with the type of work to be done. With samples of high density, I prefer to use a sample thickness, (determined by the depth of spacer ring 36), of about 0.030 inch. For samples of little density, this may be increased to say 0.750". The glass used for sample chamber walls should be of the usual optical clarity.

I claim:—

1. In a device for determining light transmissive characteristics of a substance, a support of predetermined length, upon said support a graduated scale, at either end of said support a photoelectric cell, said cells being capable of delivering substantially equal electrical output at substantially equal light intensity, a carriage mounted upon said support and adapted to travel thereon, a light source on said carriage, a pointer on said carriage to indicate on said scale the relative position of the light source between said photoelectric cells, means for positioning a predetermined thickness of a light transmissive reference standard between one cell and the light source, means for positioning a predetermined thickness of substance to be observed before the second cell, means to vary the position of the light source to bring equal intensity of transmitted light to both photoelectric cells, an electrical circuit including said cells, and therein a galvanometer to observe when such intensity is equal, and graduations upon said scale whereby relative light transmissive ability of sample and standard may be read directly by observing the position of the pointer upon the scale.

2. In a device for determining light transmissive characteristics of a substance a base of predetermined length, upon each end of such base a standard, between said standards a rack, in each of said standards a photoelectric cell, a carriage capable of travelling along the base between the standards, a light source on said carriage, a gear on said carriage to cooperate with the rack and control the travel, means for positioning a light transmissive reference standard before one photoelectric cell, means for positioning a sample of the substance to be examined before the other cell, means to observe the relative intensity of light transmitted to the two photoelectric cells and to show when it is equal, means comprising a scale and a pointer to determine the relative position of the light source between the cells when equality is obtained, and on said scale graduations whereby relative light transmissive ability of sample and standard may be read directly.

ALFRED E. TRAVER.